Patented Dec. 4, 1951

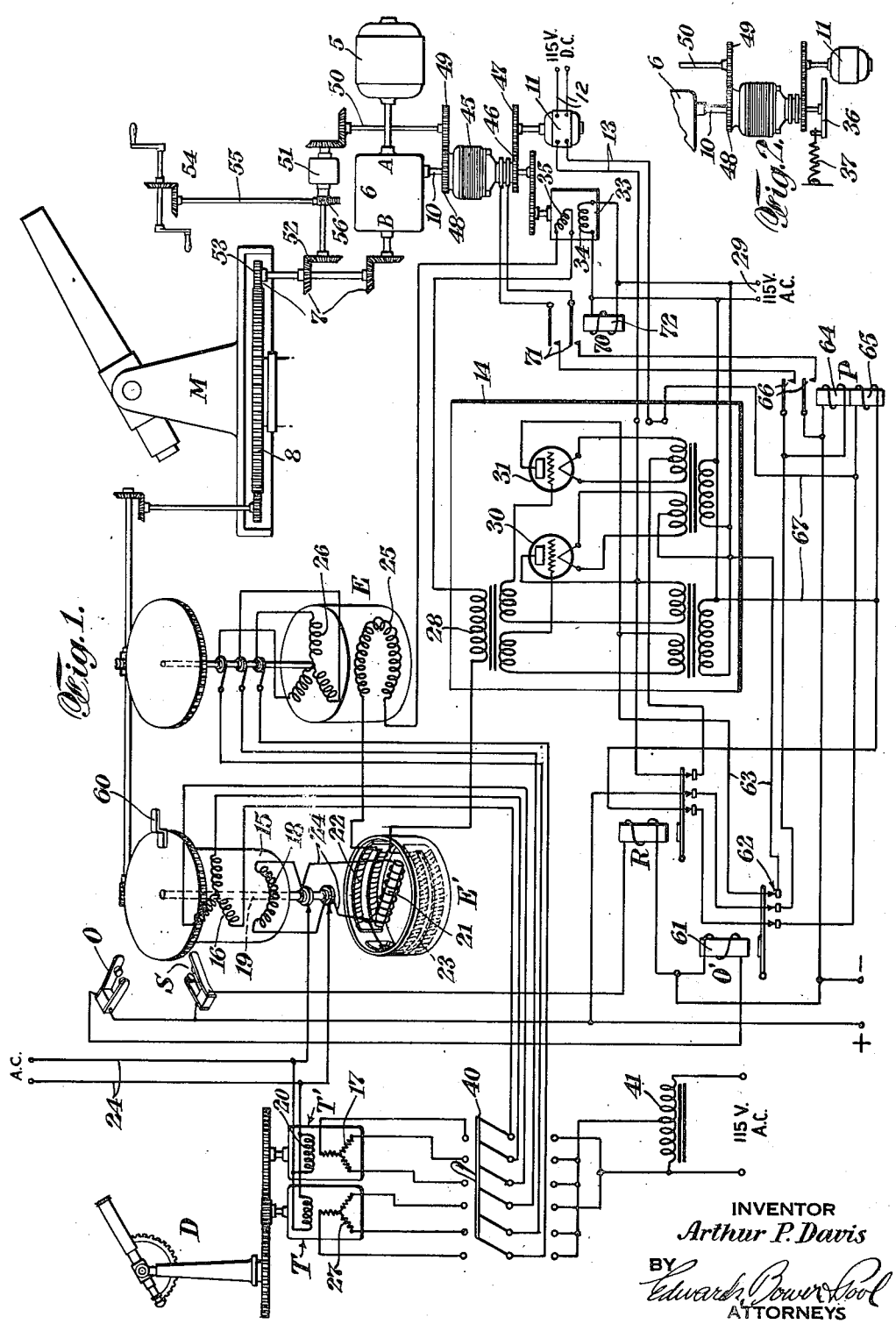

2,577,650

UNITED STATES PATENT OFFICE 2,577,650

GUN CONTROL SYSTEM

Arthur Pattison Davis, New York, N. Y., assignor, by direct and mesne assignments, to Arma Corporation, a corporation of New York Application April 18, 1933, Serial No. 666,675

10 Claims. (Cl. 89—41)

This invention relates to control systems for gun mounts and the like, and particularly to systems for large and heavy mounts requiring considerable power to move them.

The main object of the invention is to provide a system which will automatically control the power to move and position the gun mount corresponding to the movement and position of the gun director.

Another object of the invention is to effect this control by speed regulation applied between the gun mount and a substantially constant speed drive.

Further objects of the invention, particularly in the use of the standard equipment already installed for the hand control operation, will appear from the following description taken in connection with the accompanying drawings illustrating the system of this invention, in which:

Fig. 1 is a diagram showing the cooperating elements of the system, and

Fig. 2 is a diagrammatic view of the modified details.

In the system shown the gun mount M has its turn table driven by motor 5 through the hydraulic gear 6 of the variable speed type, connected by gearing 7 to the turn table gear 8.

The controlling director is shown at D, and its position is communicated by high and low speed transmitters T, T' of the self synchronous type to the high speed, low speed control motors E, E', whose rotors are geared to the gun mount M as indicated, the high speed motor E having thirty-six times the angular movement of the low speed motor E'.

The power motor 5 drives the input end A of the hydraulic gear at substantially constant speed. The speed and direction of rotation of the B end of the gear 6 is variable and is determined by the angle through which a "tilting box" (not shown) is turned. This tilting box is geared to a control shaft 10 and as this shaft is turned it tips the tilting box from one extreme to the other, varying the speed of the B end of the gear 6 from a large value in one direction progressively down through zero at mid position of the box, and then increasing to a large value in the opposite direction as the tilt in the opposite direction increases. The speed of the B end of gear 6 and gun mount gear 8 is proportional to the deflection of the tilting box from its zero or mid position, the greater the deflection the greater the speed. Consequently, the acceleration and deceleration of the gun mount movement are proportional to the rate of change of tilt of the tilting box, and, therefore, also proportional to the rate of rotation of the control shaft 10 as geared to and driven by the tilt motor 11. If the speed of this tilt motor 11 is now made to vary with the magnitude of the deviation between the director D and mount M, it will follow that, since torque is proportional to acceleration, the torque applied to the gun mount M is a function of the deviation between the mount and the director D. The greater the deviation the greater the torque, the less the deviation the less the torque, and by exerting the torque in the proper corrective direction to reduce the deviation, the mount M will be caused to follow closely the motion of the director D.

In the specific embodiment shown in the drawings, the tilt motor 11 has its field supplied with direct current at 115 volts through leads 12 connected for instance to the ship's D. C. supply. The speed of the motor is controlled by control of the armature voltage supplied through leads 13 from control box 14 connected to vary the voltage in direction and amount according to the direction and amount of the deviation between the director D and mount M. This voltage control is effected by the control motors E, E'. The housing 15 of motor E' oscillates with the gun mount M and carries the three phase self synchronous windings 16 energized from the windings 17 of director motor T', and inductively coupled to the coil 18 of vertical spindle 19 so that the latter coil tends to assume the same angular position with relation to windings 16 as the coil 20 of the director transmitter takes with respect to its windings 17. The spindle 19 also carries a magnet coil 21 having a normal neutral position on the center line of the openings between the ends of the stationary coils 22, 23 in which position no resultant voltage is induced in these coils by the alternating current in coil 21 supplied through leads 24.

As the director D is turned the spindle 19 turns substantially equally in the same direction and correspondingly shifts the magnet coil 21 from its central neutral position. A small shift of coil 21 within the areas of the gap between coils 22, 23 induces relatively small voltages in coils 22, 23, but a large relative displacement of coil 21 in relation to coils 22, 23 carrying the ends of the coil 21 close to the coils 22, 23 causes a great increase in the induced voltage in these coils. This voltage induced in coils 22, 23 increases very little for approximately 5° deviation and then increases very rapidly for approximately 5° more and then remains at a high value for about 165°. This induced voltage in coils 22, 23 is the control voltage regulating the speed of the tilt motor 11 for large deviations between the director and mount. For smaller deviations within the length of the gap between the ends of coils 22, 23 the control voltage is supplied mainly by the coil 25 of the high speed control motor E connected in series with the coils 22 and 23 as shown. The coil 25 is stationary and has voltage induced in it by the currents in windings 26 supplied by windings 27 of the high speed control motor.

The resultant voltage of coils 22, 23 and 25, called the "signal voltage," depends in magnitude and direction on the magnitude and direction of the angular difference between the director and mount. This signal voltage is applied to the control box 14, the output of which controls the speed of the tilt motor 11, in accordance with the magnitude and direction of the signal voltage as applied to the transformer 28 acting on the grid bias circuits in the control box 14.

The power for motor 11 is taken from the 115 volt A. C. line designated 29 rectified by one or the other of rectifiers 30, 31, according to the direction of the signal voltage in coil 28 and supplied to the motor 11 in amount dependent upon the amount of said signal voltage shifting the normal grid bias.

The three element half-wave rectifier tubes 30 and 31, in conjunction with input transformer 28, a filament transformer, a grid bias transformer, and a source of A. C. voltage, convert the A. C. signal voltage applied to the primary winding of input transformer 28 into a unidirectional output voltage by means of the well known rectifier-amplifier principle of electronic tubes.

When tube 30 is conductive, a uni-directional voltage of predetermined polarity is applied to the armature terminals of motor 11, and when tube 31 is conductive a uni-directional voltage of opposite polarity is applied to the armature terminals of the motor.

In operation, either tube 30 or tube 31 becomes conductive, depending on the phase of the A. C. signal voltage applied to input transformer 28; a change in the phase of the signal voltage resulting instantaneously in a switch of control from tube 30 to tube 31, or vice versa.

With the field of motor 11 excited from a constant D. C. source, the speed of the motor is proportional to the magnitude of the signal voltage applied to the primary winding of input transformer 28, and the direction of rotation of the motor is determined by whether tube 30 or tube 31 is conductive.

In order to prevent hunting or over-running, the speed of the tilt motor 11 in addition to being a function of the angular difference between the director D and the mount M is made to depend on the velocity, relative or absolute, of the gun mount. In order to accomplish this the control shaft 10 is geared to the tilt transmitter 33 comprising a primary coil 34 connected to an A. C. supply, such as 29, and inducing into the secondary 35 a voltage proportional to the deflection of the shaft 10 from the normal neutral position of the tilting box of the gear 6. This induced voltage will, therefore, be also proportional to the speed of the gun mount M. This secondary voltage of the tilt transmitter 33 is introduced in series with the signal voltage of the control motors E, E', and in series with the transformer 28 of box 14. The speed of the tilt motor 11 and consequently the torque applied to the gun mount M thus contains this tilt transmitter component proportional to the velocity of the mount, and in such a direction as to cause this velocity to decrease as the mount approaches angular agreement with the director D. By proper adjustment of the constant of proportionality between the secondary voltage of transmitter 33 and the angular deflection of the tilting box, the system can be critically damped. In this way over-running of the gun mount is reduced to a negligible amount or avoided altogether.

In Fig. 2 there is shown an alternative mechanical damping means in which the shaft 10 is provided with a gear or disk 36 having a spring 37 arranged to normally center the shaft in the neutral position of the tilting box and to resiliently oppose turning of the shaft 10 with a predetermined resistance in each direction from center. The spring 37 restricts the motion of the tilt motor 11 and reduces its speed, and therefore the torque applied to the gun mount M by an amount proportional to the deflection of the tilting box, and consequently proportional to the speed of the gun mount. By properly adjusting the tension of the spring the damping effect may be varied and made critical within any desired limits.

The control shown as applied to the turn table gear 8 of the gun mount M is also applicable to the elevating mechanism for the gun or any other desired control where the parts are to follow in movement a director or other control. In some cases, it is desirable to interrupt the automatic control and move the gun to position it in predetermined manner, such for example as to bring it to its loading position. For this purpose a loading switch 40 is provided which in its upper position connects the circuits for automatic control and in its lower position disconnects the control motors E, E' from the director transmitters T, T' and connects them to fixed voltage sources predetermined to correspond to the desired position of the gun for loading. Such voltage may be conveniently supplied by an auto-transformer 41 across the 115 voltage alternating current supply. In this way by closing the switch in the lower position the gun is automatically brought to the loading position irrespective of the director control, and then by closing the switch in the opposite direction the director control is immediately re-established.

To prevent the gun mount from over-shooting the limits of its travel and to bring the gun to rest in case of failure of the supply to the control box, a two-way magnetic clutch 45 with special control circuits is provided. When the coils of the clutch 45 are energized, the tilting shaft 10 is connected to the tilt motor 11 through gears 46, 47 and the automatic control functions as described above. In event of over-running of the mount the clutch 45 is de-energized and this disconnects the tilting shaft 10 from the gear 46 and connects said shaft to the gear 48 meshing with the gear 49 of the shaft 50, which is connected through the differential 51 and gears 52, 53 to the gun mount gear 8. The hand wheels 54 through the shaft 55 and worm and worm wheel 56 holds the differential casing stationary so that the motion of the gun mount M through the gears 53, 52 and the differential 51 and shaft 50 and gears 48, 49 turn the shaft 10 with the mount to bring the tilting box to its normal neutral mid position, bringing the mount itself to rest.

Assuming that the limit relay arm designated 60 has moved around to close the contact O, the coil 61 of the limit relay O' will be correspondingly energized, thus opening the contacts 62 of this relay. This through conductors 63 opens the armature circuit of tilt motor 11 for the direction of rotation which has closed limit relay contact O. The opening of contacts 62 also breaks the circuit of holding coil 64 of the clutch relay P, thus disconnecting the tilt shaft 10 from the motor 11 and bringing the system to rest as above explained.

As long as the arm 60 remains in contact with the limit switch O to hold it closed and there is no reverse releasing movement, the above conditions persist, and the control will be by hand wheels 54. With the contacts 62 of the limit relay O' open, the coil 65 is inserted in the armature circuit of the tilt motor 11 through conductors 67, thus permitting any current set up in the armature circuit to close the relay P. If the tilt motor 11 is energized in the opposite direction from the rectifier tube, then the clutch relay P will be closed. Any current will go through the coil 65 and thus close the relay contacts 66, thus transferring the control of the tilt motor 11 from the hand operation to the automatic circuits shown. As the limit relay contact O is opened on the reverse movement, then the contacts 62 of the relay O' are again closed, thus energizing the main coil 64 of the relay P and short circuiting the auxiliary coil 65, and the system is again in normal operation. A similar limit relay R is provided for the opposite limit relay contact S, operating in the same way as explained in connection with the limit relay O'. A shut-down relay 70 is also provided having its contacts 71 in series with the contacts 66 of the clutch relay and with its contact closing coil 72 across the A. C. supply line. Upon any failure of voltage in the supply the contacts 71 open, de-energizing a magnetic clutch and disconnecting the tilt motor and connecting up to the hand control as above described.

The driving motor 5 and the hydraulic gear 6 down to the shaft 10 are standard equipment for the operation of the gun mount as are the various gears, including the hand gear 54 and differential 51. In usual operation the control of the mount is effected by means of the hand gear 54 turning the tilting shaft 10, and the operator has before him on movable concentric disks lines representing the relative positions of the director D and the mount M so that he will turn the hand gear to keep the mount line coinciding with the director line, these disks and the self synchronous operating mechanism therefor not being shown on the drawing. The system of this invention thus provides in completely automatic form an alternative control of the tilting shaft 10, which in effect will maintain close coincidence of the director and mount movements. At the same time any failure of the automatic means or any over-running of the gun mount motion automatically restores the control to the hand operation so that reconnection of the automatic operation only takes place when the proper operating conditions have been restored.

I claim:

1. In a gun control system the combination with a gun mount, of a driving motor therefor, means between said motor and said mount for varying the relative speeds of said motor and mount, a director element, automatic control means connecting said director element and said speed varying means whereby the relative movements of said motor and mount are varied to move the mount in correspondence with the movement of the director element, hand operated means for controlling said speed varying means, and means for automatically shifting from said automatic to said hand operating means under predetermined conditions comprising a circuit actuated by predetermined movement by said automatic control means.

2. In a gun control system the combination with a gun mount, of a driving motor therefor, means between said motor and said mount for varying the relative speeds of said motor and mount, a director element, automatic control means connecting said director element and said speed varying means whereby the relative movements of said motor and mount are varied to move the mount in correspondence with the movement of the director element, hand operated means for controlling said speed varying means, and means for automatically shifting from said automatic to said hand operating means under predetermined conditions and automatically restoring said automatic operation under further predetermined conditions comprising a circuit actuated by predetermined movement by said automatic control means.

3. In a gun control system the combination with a gun mount, of a director element, means for developing a control voltage depending in magnitude and direction on the magnitude and direction of the angular difference between the director and the mount; a driving motor for the gun mount, speed varying means between said motor and said mount, a control motor positively moving said speed varying means in direct proportion to the control motor movement, means whereby said director controlled voltage is impressed on said control motor to regulate its speed and means actuated by the movement of said control motor for modifying said director controlled voltage.

4. In a gun control system the combination with a gun mount, of a director element, means for developing a control voltage depending in magnitude and direction on the magnitude and direction of the angular difference between the director and the mount; a driving motor for the gun mount, speed varying means between said motor and said mount, a control motor positively moving said speed varying means in direct proportion to the control motor movement and means whereby said director controlled voltage is impressed on said control motor to regulate its speed comprising a voltage varying means movable with said control motor and connected to modify said director controlled voltage.

5. In a gun control system the combination with a gun mount, of a director element, means for developing a control voltage depending in magnitude and direction on the magnitude and direction of the angular difference between the director and the mount; a driving motor for the gun mount, speed varying means between said motor and said mount, a control motor positively moving said speed varying means in direct proportion to the means whereby said director controlled voltage control motor movement is impressed on said control motor to regulate its speed, and means for damping the movement of the gun mount comprising a voltage varying means connected to move with the control motor for the gun mount and acting to modify the director controlled voltage so as to correspondingly regulate the speed of the control motor.

6. In a gun control system the combination with a motor drive for the gun mount, speed varying means between said drive and said mount, a director element, means for automatically controlling said speed varying means according to the movement of said director element, and means for automatically stopping said mount at the limit of predetermined movement comprising means automatically disconnecting said director control and connecting said speed varying means to a control driven by said gun mount.

7. In a gun control system the combination with a gun mount, of means for moving said mount, a director element, electrical motion transmission means operatively connected to said element for controlling said first means, and means for simultaneously disconnecting said director element and substituting another control automatically operating said transmission means to cause said first means to bring said gun mount to a predetermined desired position.

8. In a gun control system the combination with a gun mount, of means for moving said mount, a director element, electrical motion transmission means operatively connected to said element for controlling said first means, and means for simultaneously disconnecting said director element and substituting another control automatically operating said transmission means to cause said first means to bring said gun mount to a predetermined desired position, said disconnecting means being operable to reconnect said director element so as to automatically restore its control of the gun mount.

9. In a gun control system the combination with a gun mount, of a driving motor therefor, means between the motor and mount for varying the relative speeds of said motor and mount, a director element, self-synchronous means connected to be actuated from said director element, restoring mechanism between said gun mount and said self-synchronous means, electrical connecting means between said self-synchronous means and said speed varying means to control the speed of said gun mount relative to said director element, and separate means actuated by the movement of said control means for regulating the torque applied to said gun mount from said driving motor.

10. In a gun control system the combination with a gun mount, of a driving motor therefor, means between the motor and mount for varying the relative speeds of said motor and mount and comprising a deflectable member regulating the speed of said mount proportionately to the deflection of said member, a director element, self-synchronous means connected to be actuated from said director element, restoring mechanism between said gun mount and said self-synchronous means, connecting means between said self-synchronous means and said speed varying means to control the speed of said gun mount by deflection of said member according to the angular difference between the director and mount and separate means actuated by the movement of said control means for regulating the torque applied to said gun mount from said driving motor.

ARTHUR PATTISON DAVIS.

REFERENCES CITED

The following references are of record in the file of this patent:

UNITED STATES PATENTS

| Number | Name | Date |
|---|---|---|
| 1,143,948 | Dawson et al. | June 22, 1915 |
| 1,165,121 | Pratt | Dec. 21, 1915 |
| 1,238,503 | Fiske | Aug. 28, 1917 |
| 1,308,550 | Manly | July 1, 1919 |
| 1,387,678 | Anderson | Aug. 16, 1921 |
| 1,472,885 | Perham | Nov. 6, 1923 |
| 1,518,882 | Walker et al. | Dec. 9, 1924 |
| 1,530,445 | Warren | Mar. 17, 1925 |
| 1,559,566 | Farrell et al. | Nov. 3, 1925 |
| 1,612,118 | Hewlett et al. | Dec. 28, 1926 |
| 1,684,132 | Hewlett et al. | Sept. 11, 1928 |